United States Patent
Pritchard et al.

(10) Patent No.: US 7,810,196 B1
(45) Date of Patent: Oct. 12, 2010

(54) INDEPENDENTLY EXTENDABLE TRUCK RAMPS AND ASSOCIATED USE THEREFOR

(76) Inventors: Tyler Pritchard, 327 Promenade Brunet, Winnipag, MB (CA) R2J 4R4; Serge Roy, 327 Promenade Brunet, Winnipag, MB (CA) R2J 4R4

( * ) Notice: Subject to any disclaimer, the term of this patent is extended or adjusted under 35 U.S.C. 154(b) by 142 days.

(21) Appl. No.: 12/082,336

(22) Filed: Apr. 10, 2008

(51) Int. Cl.
*E01D 1/00* (2006.01)

(52) U.S. Cl. ...................... 14/69.5; 414/537

(58) Field of Classification Search ............ 14/69.5, 14/71.1; 414/537; 193/38
See application file for complete search history.

(56) References Cited

U.S. PATENT DOCUMENTS

| | | | | |
|---|---|---|---|---|
| 4,528,711 A | * | 7/1985 | Packer | 14/69.5 |
| 4,628,561 A | * | 12/1986 | Kushniryk | 14/69.5 |
| 4,912,796 A | * | 4/1990 | Crump | 14/69.5 |
| 5,137,114 A | * | 8/1992 | Yde et al. | 182/49 |
| 5,277,436 A | * | 1/1994 | Frank et al. | 280/5.2 |
| 5,312,149 A | * | 5/1994 | Boone | 296/61 |
| D360,729 S | | 7/1995 | Collins | |
| 5,768,733 A | * | 6/1998 | Kneebone | 14/69.5 |
| 5,803,523 A | * | 9/1998 | Clark et al. | 296/26.1 |
| D401,731 S | | 11/1998 | Jeruss | |
| 6,345,950 B1 | | 2/2002 | Gerwitz | |
| 6,431,815 B1 | | 8/2002 | Zarzecki et al. | |
| 6,484,344 B1 | | 11/2002 | Cooper | |
| 6,575,516 B2 | | 6/2003 | Webber | |
| 6,722,721 B2 | | 4/2004 | Sherrer et al. | |
| 6,834,903 B2 | | 12/2004 | Harper et al. | |
| 6,887,028 B1 | | 5/2005 | Kirla, Jr. | |
| 6,913,305 B1 | | 7/2005 | Kern et al. | |
| 7,100,232 B2 | | 9/2006 | Zhang | |
| 7,284,781 B2 | * | 10/2007 | Grant | 296/61 |
| 7,493,874 B2 | * | 2/2009 | Simpson et al. | 119/849 |
| 7,533,923 B1 | * | 5/2009 | Caldwell | 296/61 |
| 7,549,692 B2 | * | 6/2009 | Washington | 296/61 |
| 2005/0160539 A1 | * | 7/2005 | Schomaker et al. | 14/69.5 |

* cited by examiner

*Primary Examiner*—Gary S Hartmann
(74) *Attorney, Agent, or Firm*—Montgomery Patent and Design; Robert C. Montgomery; Joseph T. Yaksich

(57) ABSTRACT

The invention as presently conceived discloses a variable length ramp system attachable to a standard pickup truck that assists with the loading of all-terrain vehicles (ATV's), small tractors, yard equipment, golf carts, and similar items. The length of each ramp can vary independently with the other from a minimum of approximately four feet to a maximum of eight feet. The extension is similar to that of an extension ladder in which once piece slides inside the other. A textile strap with connectors provides further securement of the ramps with the truck body. When not in use, the ramps can be collapsed and stored in minimal space.

6 Claims, 5 Drawing Sheets

INDEPENDENTLY EXTENDABLE TRUCK RAMPS AND ASSOCIATED USE THEREFOR

RELATED APPLICATIONS

The present invention was first described in Disclosure Document No. 607,439 filed on Oct. 16, 2006.

FIELD OF THE INVENTION

The present invention describes a device and method for a loading and unloading smaller wheeled vehicles such as ATV's, golf carts, and the like, or for hauling landscaping equipment such as riding lawnmowers from the bed of a pick-up truck.

BACKGROUND OF THE INVENTION

Ramps normally are required to get such heavy equipment into and out of the bed. Ramps have disadvantages. First, their long lengths make them difficult to store, especially in short bed pickup trucks. If one should use shorter ramps, they increase the approach angle and the danger of an accident increases. Second, many times the grade around loading and unloading locations is uneven and ramps, even though the same length, will sit at different angles. This causes the equipment being loaded or unloaded to wobble to one side or the other, also reducing safety. Accordingly, there is a need for a means by which ramps for pickup trucks can be provided which address the disadvantages as described above. The development of the invention herein described fulfills this need.

U.S. Pat. No. 7,100,232 issued to Zhang discloses vehicle ramp. This patent does not appear to disclose an apparatus that is retractable nor does it possess a strap assembly to provide stability.

U.S. Pat. No. 6,913,305 issued to Kern and Harper discloses a tailgate ramp system. This patent does not appear to disclose an apparatus that can be utilized on different surfaces, is detachable nor possesses a strap system for added stability.

U.S. Pat. No. 6,887,028 issued to Kirla discloses ramp-rack for a truck or other transport vehicle. This patent does not appear to disclose an apparatus that can be utilized on different surfaces nor does it possess a strap assembly for added stability.

U.S. Pat. No. D 505,238 issued to Robertson discloses a vehicle ramp. This design patent does not appear to disclose a strap assembly for stability, does not possess an attachment plate and the issued patent differs in appearance from the instant invention.

U.S. Pat. No. 6,834,903 issued to Harper discloses tailgate ramp system. This patent does not appear to disclose an apparatus that can be utilized on different surfaces, is detachable nor possesses a strap system for added stability.

U.S. Pat. No. 6,722,721 issued to Sherrer and Doherty discloses a pickup truck foldable ramp tailgate. This patent does not appear to disclose an apparatus that is retractable nor does it possess a strap assembly to provide stability.

U.S. Pat. No. 6,575,516 issued to Webber discloses a tailgate ramp and load locking accessories for a pickup truck. This patent does not appear to disclose an apparatus that is retractable nor does it possess a strap assembly to provide stability.

U.S. Pat. No. 6,484,344 issued to Cooper discloses a retractable access ramp. This patent does not appear to disclose an apparatus that is specifically designed for truck beds and possesses a strap assembly for added stability while loading or unloading.

U.S. Pat. No. 6,431,815 issued to Zarzecki et al. discloses a foldable retractable loading ramp assembly. This patent does not appear to disclose an apparatus that is portable and attachable to a variety of surfaces nor does it possess a strap assembly.

U.S. Pat. No. 6,345,950 issued to Gerwitz discloses a telescoping ramp comprised of modular units. This patent does not appear to disclose an apparatus that possesses a ladder-like structure or a strap assembly for added stability while loading or unloading.

U.S. Pat. No. D 401,731 issued to Jeruss discloses a ramp for loading and unloading trucks. This design patent does not appear to disclose a strap assembly for stability, does not possess an attachment plate and the issued patent differs in appearance from the instant invention.

U.S. Pat. No. D 360,729 issued to Collins discloses a ATV rap unit for a pickup truck. This design patent does not appear to disclose a strap assembly for stability, does not possess an attachment plate and the issued patent differs in appearance from the instant invention.

The prior art appears to disclose devices which consist of ramps that can be utilized to load and unload truck beds. The prior art does not appear to disclose a device that is portable, possesses a strap assembly for added stability and can be utilized on a variety of truck surfaces.

SUMMARY OF THE INVENTION

In view of the foregoing disadvantages inherent in the prior art, it has been observed that there is need for an apparatus and method for independently extendable truck ramps, which provide a means for a pair of ladder-type ramps with independently variable lengths, such as four (4) to seven (7) feet, to load/unload various small vehicles such as all-terrain vehicles, garden tractors, and the like onto a pick-up style truck.

The independently extendable truck ramps provides a convenient and safe way to load and unload various types of small vehicles onto a pick-up truck.

The independently extendable truck ramps comprises an upper ramp section, a lower ramp section, and a strap assembly.

The independently extendable truck ramps when not in use can be collapsed and stored compactly.

The independently extendable truck ramps further comprise a lower ramp section slidingly inserted into an upper ramp section in a telescoping manner similar to that of an extension ladder and secured with a textile strap to a pick-up truck chassis.

The length of the independently extendable truck ramps is adjustable using a locking pin and a series of locking holes.

The independently extendable truck ramps possess identical right and left portions.

The independently extendable truck ramps provide an independently adjustable and locking length, thereby compensating for various loading conditions such as uneven ground contours.

The independently extendable truck ramps may be placed upon a many surfaces, such as but not limited to a tailgate, a truck bed, a bumper, or similar supporting surfaces.

The upper ramp section and the lower ramp section provide a slidingly telescoping and variable lengthening means to the apparatus.

The upper ramp section further comprises a pair of upper rails, a plurality of upper cross-members, and a pair of attaching plates.

The upper rails and the upper cross-members are arranged and welded to form a ladder-like ramp structure.

The attaching plates comprise a welded-in feature being located at a forward-end of said upper ramp section resting thereupon the truck bumper or tailgate, thereby providing a stabilizing means to the apparatus.

The lower ramp section comprises a ladder-like weldment similar to the upper ramp section.

The lower ramp section further comprises a pair of lower rails, a plurality of lower cross-members, and a pair of beveled feet.

The lower rails comprise opposing channel shaped members which provide a sliding and captivating attachment means to the upper rail sections.

The beveled feet are located at a lower end of said lower rails forming a generally parallel surface to the ground.

The strap assembly provides a connection to the chassis of the truck, thereby protecting the apparatus from sliding or skidding out of position during loading or unloading.

The strap assembly provides a securing means beneath the apparatus being attached thereto the truck chassis and an upper cross-member portion.

The strap assembly provides an attachment means to a truck bumper or frame feature via a forward hook.

Said strap assembly further provides an attaching means via a rear hook to an upper cross-member, thereby controlling the axial position of the apparatus.

The strap assembly is envisioned to be similar to common commercially available rigging equipment used for such purposes, thereby providing hooks and textile strapping material as well as length varying equipment such as a ratcheting or binding type devices being common in the industry.

The independently extendable truck ramps may be provided in longer or shorter configurations.

The upper rail section comprises a pair of upper rails, a plurality of upper cross-members, a pair of attaching plates, and a plurality of locking holes.

The upper rail section and upper rails form a ladder-like weldment, thereby providing a traction and support means for various small vehicles when being loaded into a pickup truck.

The upper rails comprise a pair of structural members being positioned in a parallel manner and being spaced at approximately eight (8) to sixteen (16) inches apart.

The upper rails are envisioned being manufactured of hollow structural square tubing envisioned to be approximately three-quarters (¾) to one-and-a-half (1½) inches wide.

The upper rails further provide an attachment means to a series of upper cross-members.

The upper cross-members comprise a series of parallel members arranged in a perpendicular orientation relative to the upper rails.

The upper cross-members are envisioned to be made using cut lengths of solid bar stock with an approximate cross-section of one-half (½) to one (1) inch wide.

The upper cross-members are arranged with an approximate spacing of six (6) to ten (10) inches.

The ends of each upper cross-member are envisioned to be welded all around and perpendicular to opposing inner faces of said upper rails.

The attaching plates provide a stabilizing and load bearing surface being placed upon a top surface of a tailgate or bumper.

The attaching plates comprise a welded-in plate extending approximately six (6) to ten (10) inches at an approximate angle of thirty degrees (30°) from a top surface of the upper ramp section.

A plurality of locking holes is provided along an outside vertical surface of the upper rail at an approximate spacing of four (4) to six (6) inches.

The locking holes provide a variety of relative locking positions to the upper ramp section and the lower ramp section, respectively, via a locking pin.

The upper rail section is envisioned being made using materials such as plated steel, painted steel, aluminum alloy, or the like.

The lower ramp section comprises a pair of lower rails, a plurality of lower cross-members, a pair of beveled feet, a plurality of stiffening plates, a locking pin hole, and a locking pin.

The lower rails and the lower cross-members form a ladder-like weldment similar to the upper rail section.

The lower rails comprise a pair of opposing channel shapes with an open side facing inwardly.

The lower rails are particularly spaced so as to capture and slidingly guide the upper ramp section.

The lower cross-members are arranged perpendicular to the lower rails forming a series of parallel members located upon an upper horizontal surface of said lower rails at an approximate spacing of six (6) to ten (10) inches and welded thereto.

A plurality of stiffening plates are welded along a bottom surface of said lower rails to provide additional rigidity to the lower ramp section.

The stiffening plates are envisioned to be made using flat metal shapes approximately one-quarter (¼) inch thick and two (2) inches wide.

The locking pin hole is located along an outside vertical surface of the lower rail at a corresponding position to the aforementioned locking holes.

The locking pin provides a selectable locking means when engagingly inserted through the locking pin hole and an aligned locking hole, thereby securing the length of the apparatus to a desired length.

The locking pin is envisioned to be a quick release or ball lock-type pin common in the industry.

The lower rail section is envisioned to be made using similar materials as the upper rail section.

The independently extendable truck ramps may be used by performing the following steps: lowering the tailgate and removing the locking pins from the locking pin holes; extending in a sliding fashion each of the lower ramp sections outward until obtaining a desired length; extending both ramp assemblies to the same length to provide maximum stability unless ground contour conditions warrant differing lengths, keeping in mind that the further the apparatus is extended, the more gradual the resultant angle of descent; aligning the locking pin hole with the closest locking hole and inserting the locking pin securely through both the lower rail and the upper rail walls; attaching the forward hook portion of each strap assembly to an upper cross-member using the rear hook; attaching the forward hook to a chassis or bumper feature; removing any excess slack in the strap portion to secure the strap assembly; driving a small vehicle such as all-terrain vehicle, garden tractor, or the like up the apparatus and onto the pick-up truck; removing the locking pin and sliding each lower rail section inward until the apparatus is in the collapsed storage state within the pick-up truck; closing the tailgate; securing and transporting said small vehicle as desired; repeating the above procedure to unload said small vehicle as required; and, benefiting from the security and safety afforded the user when using the present invention.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
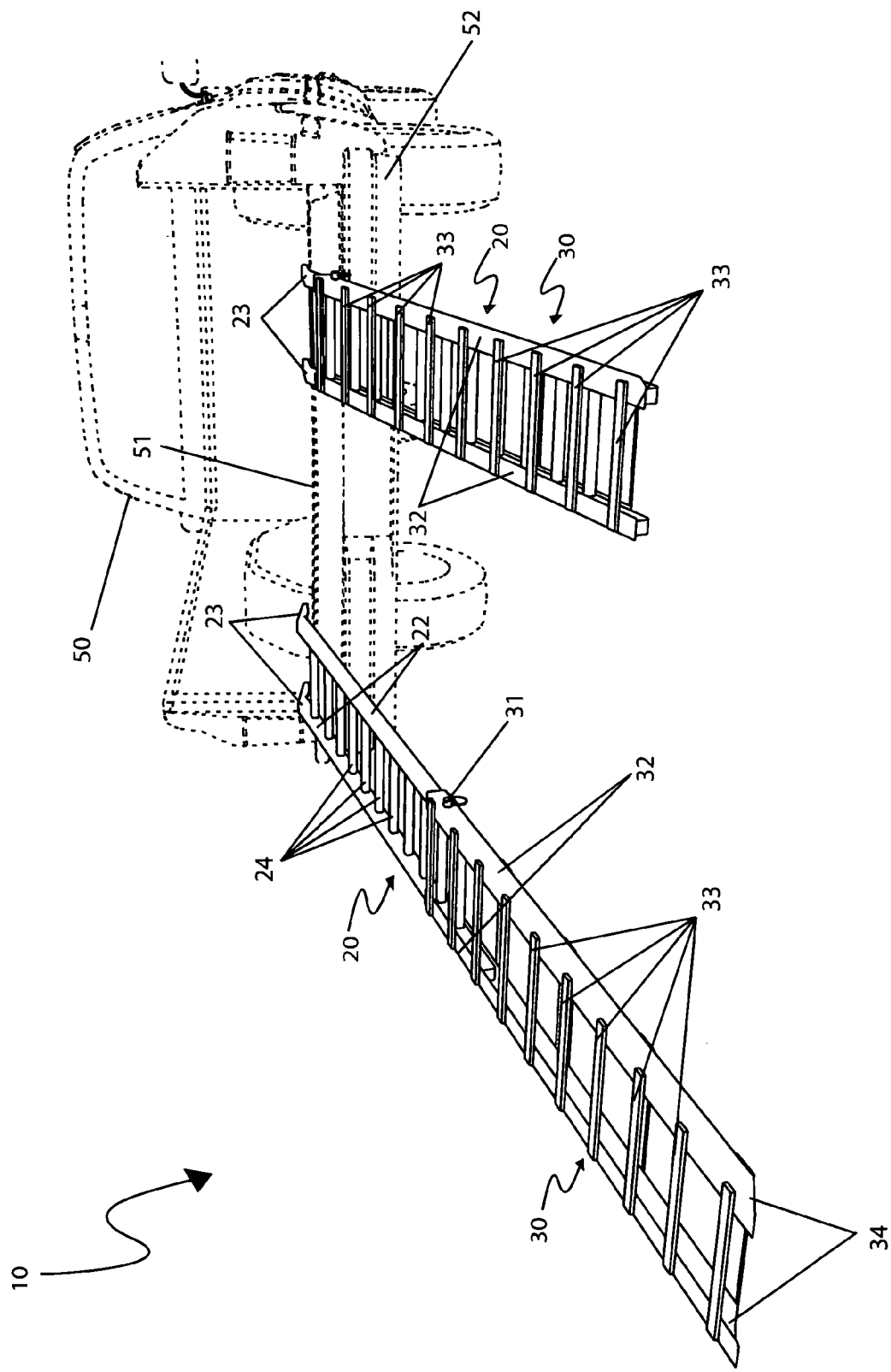
FIG. 1 is an environmental view of independently extendable truck ramps 10, according to a preferred embodiment of the present invention.

DESCRIPTIVE KEY 10 independently extendable truck ramps
20 upper ramp section
21 locking hole
22 upper rail
23 attaching plate
24 upper cross-member
30 lower ramp section
31 locking pin
32 lower rail
33 lower cross-member
34 beveled foot
35 locking pin hole
36 stiffening plate
40 strap assembly
41 forward hook
42 strap
43 rear hook
50 truck
51 tailgate
52 bumper

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for independently extendable truck ramps (herein described as the "apparatus") 10, which provide a means for a pair of ladder-type ramps with independently variable lengths from four (4) to seven (7) feet preferably to load/unload various small vehicles such as all-terrain vehicles, garden tractors, and the like onto a pick-up truck 50. Each portion of the apparatus 10 comprises a lower ramp section 30 slidingly inserted into an upper ramp section 20 in a telescoping manner similar to that of an extension ladder and secured with a textile strap 40 to a pick-up truck chassis 50. The length of the apparatus 10 is adjustable using a locking pin 31 and a series of locking holes 21. When not in use, the apparatus 10 can be collapsed and stored compactly. It is envisioned that the apparatus 10 is to be provided in identical right and left portions and therefore, a single ramp portion may be described herein for purposes of simplicity.

Referring now to FIG. 1, an environmental view of the apparatus 10, according to the preferred embodiment of the present invention, is disclosed. The apparatus 10 comprises an upper ramp section 20, a lower ramp section 30, and a strap assembly 40. The apparatus 10 provides an independently adjustable and locking length, thereby compensating for various loading conditions such as uneven ground contours. The apparatus 10 is illustrated here mounted upon a tailgate 51; however, to those skilled in the art, it is obvious that the invention 10 may work equally well when placed upon a truck bed 50, a bumper 52, or similar supporting surfaces and as such should not be interpreted as a limiting factor of the present invention 10. The upper ramp section 20 and the lower ramp section 30 provide a slidingly telescoping and variable lengthening means to the apparatus 10.

The upper ramp section 20 further comprises a pair of upper rails 22, a plurality of upper cross-members 24, and a pair of attaching plates 23. The upper rails 22 and the upper cross-members 24 are arranged and welded to form a ladder-like ramp structure. The attaching plates 23 comprise a welded-in feature being located at a forward-end of said upper ramp section 20 resting thereupon the truck bumper 52 or tailgate 51, thereby providing a stabilizing means to the apparatus 10 (see FIG. 4).

The lower ramp section 30 comprises a ladder-like weldment similar to the upper ramp section 20. The lower ramp section 30 further comprises a pair of lower rails 32, a plurality of lower cross-members 33, and a pair of beveled feet 34. The lower rails 32 comprise opposing channel shaped members which provide a sliding and captivating attachment means to the upper rail sections 20. The beveled feet 34 are located at a lower end of said lower rails 32 forming a generally parallel surface to the ground (see FIG. 5).

Figure 2:
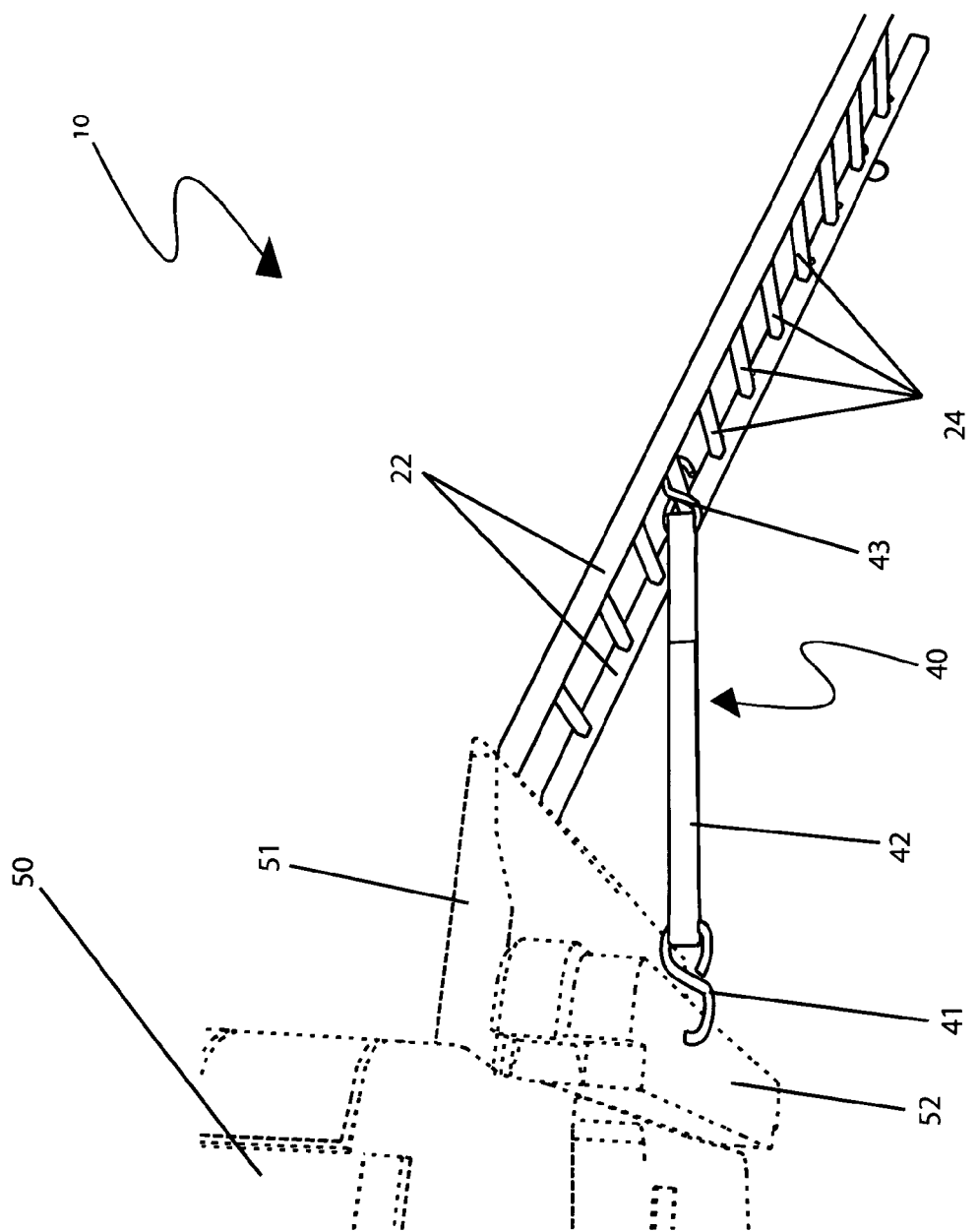
FIG. 2 is an upward looking view of a strapping assembly portion 40 of independently extendable truck ramps 10, according to a preferred embodiment of the present invention.

A strap assembly 40 provides a connection to the chassis of the truck 50, thereby protecting the apparatus 10 from sliding or skidding out of position during loading/unloading (see FIG. 2).

Referring now to FIG. 2, an upward looking view of a strapping assembly portion 40 of the apparatus 10, according to the preferred embodiment of the present invention, is disclosed. The apparatus 10 as shown here comprises an upper rail section 20 and a strap assembly 40. The strap assembly 40 provides a securing means beneath the apparatus 10 being attached thereto the truck chassis 50 and an upper cross-member 24 portion. The strap assembly 40 provides an attachment means to a truck bumper 52 or frame feature 50 via a forward hook 41. Said strap assembly 40 further provides an attaching means via a rear hook 43 to an upper cross-member 24, thereby controlling the axial position of the apparatus 10. The strap assembly 40 is envisioned to be similar to common commercially available rigging equipment used for such purposes, thereby providing hooks and textile strapping material as well as length varying equipment such as a ratcheting or binding type devices being common in the industry.

Figure 3:
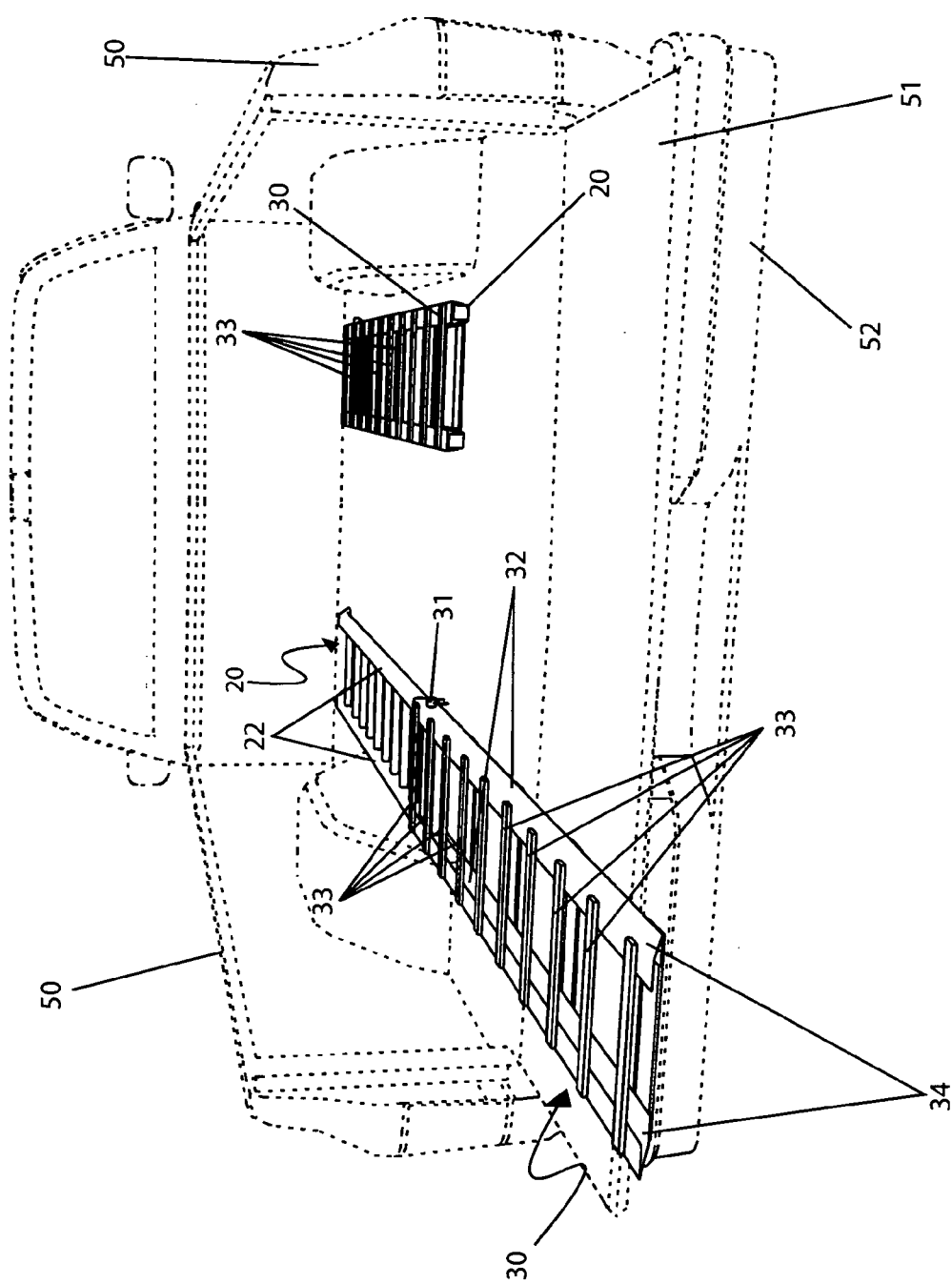
FIG. 3 is a perspective view of independently extendable truck ramps 10 in a stored state, according to a preferred embodiment of the present invention.

Referring now to FIG. 3, a perspective view of the apparatus 10 in a stored state, according to the preferred embodiment of the present invention, is disclosed. The apparatus 10 is illustrated here in both a partially extended state and in a fully retracted state. The apparatus 10 is depicted here in the preferred embodiment being a maximum of seven (7) feet long, thereby enabling enclosure within a pick-up truck bed 50 when in the fully retracted state; however, it is envisioned that the invention 10 may be provided in longer or shorter configurations and as such should not be interpreted as a limiting factor of the present invention 10.

Figure 4:
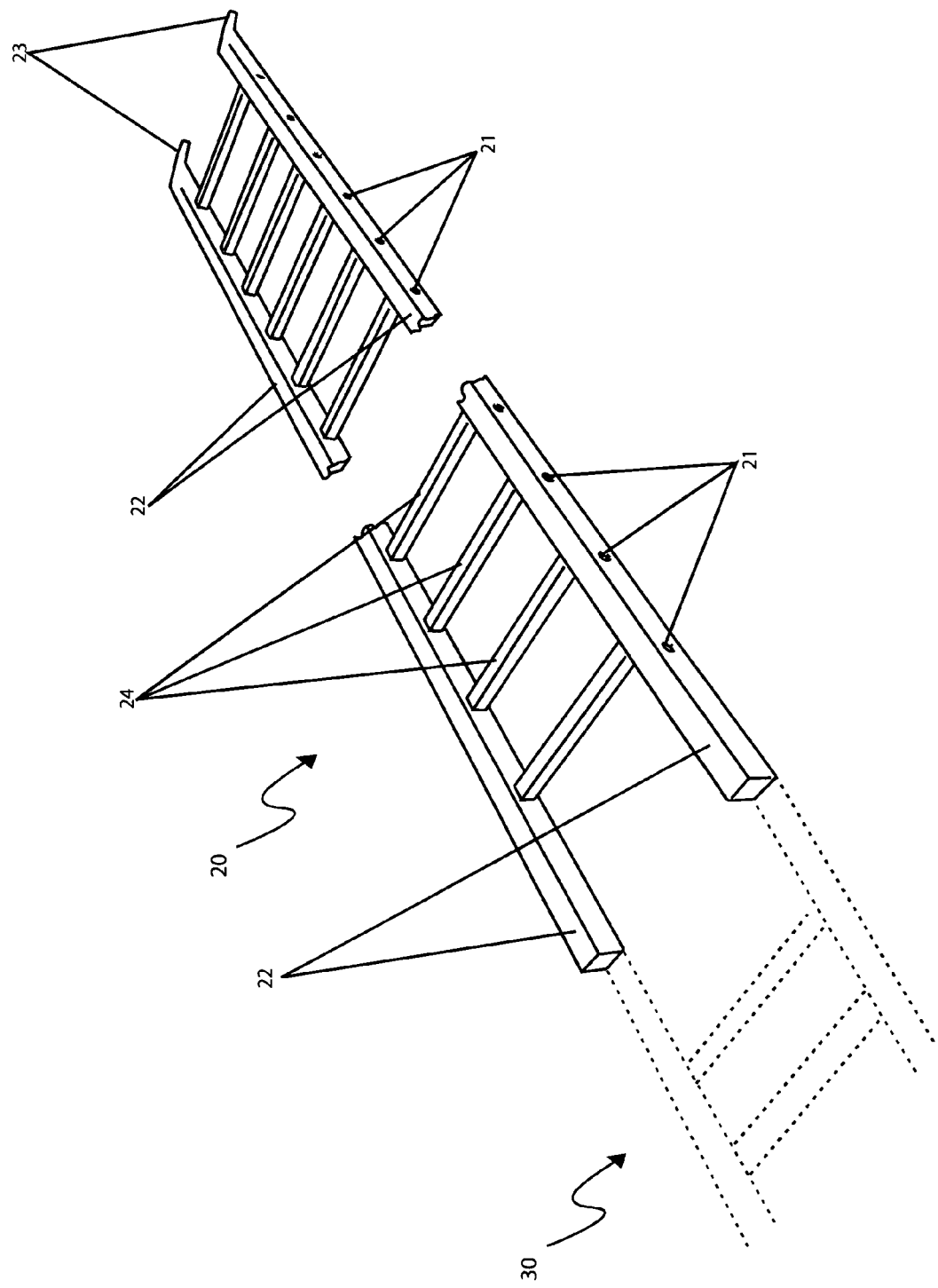
FIG. 4 is a perspective view of an upper ramp section 20 of independently extendable truck ramps 10, according to a preferred embodiment of the present invention; and, FIG. 5 is a perspective view of a lower ramp section 30 of independently extendable truck ramps 10, according to a preferred embodiment of the present invention.

Referring now to FIG. 4, a perspective view of an upper ramp section 20 of the apparatus 10, according to the preferred embodiment of the present invention, is disclosed. The upper rail section 20 comprises a pair of upper rails 22, a plurality of upper cross-members 24, a pair of attaching plates 23, and a plurality of locking holes 21. The upper rail section 20 and upper rails 22 form a ladder-like weldment, thereby providing a traction and support means for various small vehicles when being loaded into a pickup truck 50.

The upper rails 22 comprise a pair of structural members being positioned in a parallel manner and being spaced at approximately eight (8) to sixteen (16) inches apart. The upper rails 22 are envisioned being manufactured of hollow structural square tubing envisioned to be approximately three-quarters (¾) to one-and-a-half (1½) inches wide. The upper rails 22 further provide an attachment means to a series of upper cross-members 24.

The upper cross-members 24 comprise a series of parallel members arranged in a perpendicular orientation relative to the upper rails 22. The upper cross-members 24 are envisioned to be made using cut lengths of solid bar stock with an approximate cross-section of one-half (½) to one (1) inch wide. The upper cross-members 24 are arranged with an approximate spacing of six (6) to ten (10) inches. The ends of each upper cross-member 24 are envisioned to be welded all around and perpendicular to opposing inner faces of said upper rails 22.

The attaching plates 23 provide a stabilizing and load bearing surface being placed upon a top surface of a tailgate 51 or bumper 52. The attaching plates 23 comprise a welded-in plate extending approximately six (6) to ten (10) inches at an approximate angle of thirty (30) degrees from a top surface of the upper ramp section 20.

A plurality of locking holes 21 is provided along an outside vertical surface of the upper rail 22 at an approximate spacing of four (4) to six (6) inches. The locking holes 21 provide a variety of relative locking positions to the upper ramp section 20 and the lower ramp section 30, respectively, via a locking pin 31 (see FIG. 5).

The upper rail section 20 is envisioned being made using materials such as plated steel, painted steel, aluminum alloy, or the like.

Figure 5:
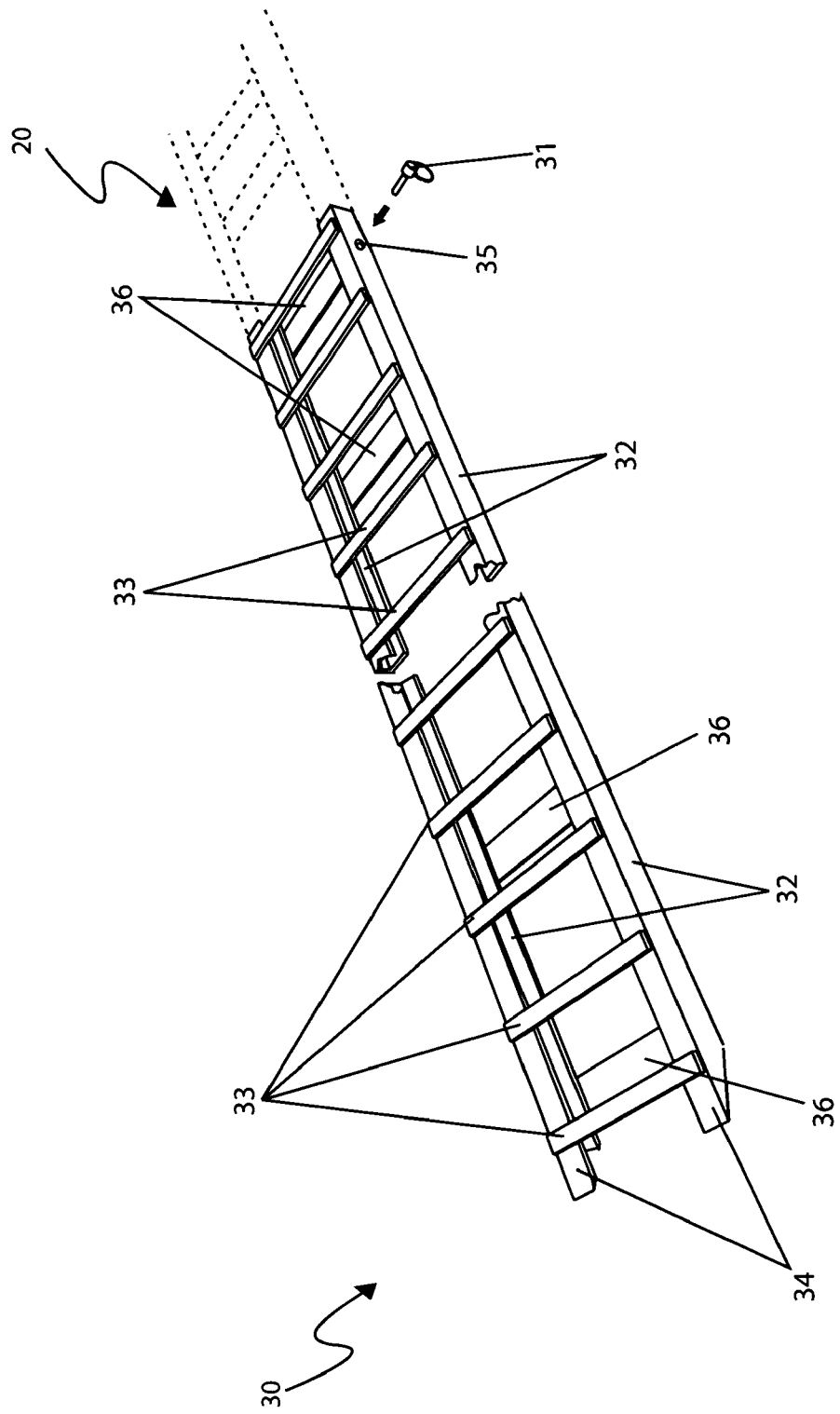

Referring now to FIG. 5, a perspective view of a lower ramp section 30 of the apparatus 10, according to the preferred embodiment of the present invention, is disclosed. The lower ramp section 30 comprises a pair of lower rails 32, a plurality of lower cross-members 33, a pair of beveled feet 34, a plurality of stiffening plates 36, a locking pin hole 35, and a locking pin 31. The lower rails 32 and the lower cross-members 33 form a ladder-like weldment similar to the upper rail section 20 (see FIG. 4).

The lower rails 32 comprise a pair of opposing channel shapes with an open side facing inwardly. The lower rails 32 are particularly spaced so as to capture and slidingly guide the upper ramp section 20. The lower cross-members 33 are arranged perpendicular to the lower rails 32 forming a series of parallel members located upon an upper horizontal surface of said lower rails 32 at an approximate spacing of six (6) to ten (10) inches and welded thereto.

A plurality of stiffening plates 36 are welded along a bottom surface of said lower rails 32 to provide additional rigidity to the lower ramp section 30. The stiffening plates 36 are envisioned to be made using flat metal shapes approximately (¼) inch thick and two (2) inches wide.

The locking pin hole 35 is located along an outside vertical surface of the lower rail 32 at a corresponding position to the aforementioned locking holes 21 (see FIG. 4). The locking pin 31 provides a selectable locking means when engagingly inserted through the locking pin hole 35 and an aligned locking hole 35, thereby securing the length of the apparatus 10 to a desired length. The locking pin 31 is envisioned to be a quick release or ball lock-type pin common in the industry.

The lower rail section 30 is envisioned to be made using similar materials as the upper rail section 20.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: lowering the tailgate 51 and removing the locking pins 31 from the locking pin holes 35; extending in a sliding fashion each of the lower ramp sections 30 outward until obtaining a desired length; extending both ramp assemblies 10 to the same length to provide maximum stability unless ground contour conditions warrant differing lengths, keeping in mind that the further the apparatus 10 is extended, the more gradual the resultant angle of descent; aligning the locking pin hole 35 with the closest locking hole 21 and inserting the locking pin 31 securely through both the lower rail 32 and the upper rail 22 walls; attaching the forward hook portion 41 of each strap assembly 40 to an upper cross-member 24 using the rear hook 43; attaching the forward hook 41 to a chassis 50 or bumper 52 feature; removing any excess slack in the strap portion 42 to secure the strap assembly 40; driving a small vehicle such as all-terrain vehicle, garden tractor, or the like up the apparatus 10 and onto the pick-up truck 50; removing the locking pin 31 and sliding each lower rail section 30 inward until the apparatus 10 is in the collapsed storage state within the pick-up truck 50; closing the tailgate 51; securing and transporting said small vehicle as desired; repeating the above procedure to unload said small vehicle as required; and, benefiting from the security and safety afforded the user when using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A truck ramp system for loading and unloading existing small vehicles onto an existing truck, said truck ramp system comprising:
    an upper ramp section removably coupled to a rear portion of the existing truck, further comprising:
        a plurality of upper rails spaced apart and registered parallel to each other;
        a plurality of upper cross-members directly and statically coupled to said upper rails and configured in such a manner therewith to form a ladder; and,
        a pair of attaching plates located at a forward-end of said upper ramp section and being statically engaged therewith, said attaching plates being removably positioned on said rear truck portion and thereby defining a highest elevation of said upper ramp section during operating conditions;
    a lower ramp section adjustably connected to said upper ramp section, further comprising:
        a pair of opposing lower rails having channels formed therein and being provided with an open side facing inwardly respectively, said lower rails being configured in such a manner that said lower rails telescopically capture and slidingly guide corresponding ones of said upper rails within said channels respectively;
        a plurality of lower cross-members connected to said lower rails respectively; and,
        a pair of beveled feet located at respective lower ends of said lower rails and forming a generally parallel surface to a ground;
    a strap assembly connected to said upper ramp section and a rigid portion of the existing truck for maintaining said upper and lower ramp sections at substantially stable positions during loading and unloading operations; and,
    means for adjustably locking said lower ramp section to alternate portions of said upper ramp section in such a manner that a combined longitudinal length of said upper and lower ramp sections is adapted.

2. The truck ramp system of claim 1, wherein said strap assembly is disposed beneath said upper rail section and the rear truck portion that mates with said upper rail section respectively.

3. The truck ramp system of claim 2, wherein said strap assembly comprises:
    a forward hook connected to a rigid portion of the existing truck;
    a rear hook attached to one of said upper cross-members of said upper rail section; and,
    a strap having opposed ends anchored to said forward and rear hooks respectively.

4. The truck ramp system of claim 1, wherein said upper cross-members comprise: a series of parallel rectilinear members arranged in a perpendicular orientation relative to said upper rails, said rectilinear members being directly attached to opposing inner faces of said upper rails and spaced beneath corresponding top faces of said upper rails respectively.

5. The truck ramp system of claim 1, wherein said adjustably locking means comprises:
    a plurality of locking holes formed in each of said upper and lower rails of said upper and lower ramp sections respectively; and,
    a locking pin removably interfitted through aligned ones of said locking holes of each of said lower and upper ramp sections respectively, said locking pin traversing a longitudinal length of said upper and lower ramp sections.

6. The truck ramp system of claim 4, wherein said lower ramp section further comprises:
    a plurality of stiffening plates having axially opposed ends directly mated with said lower rails;
    wherein said lower cross-members are arranged perpendicular to said lower rails and are located upon an upper horizontal surface of said lower rails such that said lower cross-members freely travel above said rectilinear members of said upper ramp section during telescopic adjustment.

* * * * *